United States Patent [19]

Harrison et al.

[11] 4,274,904

[45] Jun. 23, 1981

[54] TAPE DISPENSER AND APPLICATOR ASSEMBLY

[76] Inventors: Thomas F. Harrison, 1531 Sherwood Ave., Baltimore, Md. 21239; Donald I. Gill, 2805 Moorgate Rd., Dundalk, Md. 21222

[21] Appl. No.: 59,345

[22] Filed: Jul. 20, 1979

[51] Int. Cl.[3] .......... B29C 17/00

[52] U.S. Cl. .......... 156/461; 156/201; 156/268; 156/475; 156/584

[58] Field of Search .......... 156/461, 463-465, 156/467, 468, 477 R, 478, 479, 475, 200-202, 216, 584, 577, 530; 226/196, 197; 81/9.5 R, 9.5 C, 9.51

[56] References Cited

U.S. PATENT DOCUMENTS

| | | | |
|---|---|---|---|
| 1,042,443 | 10/1912 | Jacobie | 156/464 |
| 1,575,925 | 3/1926 | Maranville | 156/463 X |
| 1,624,544 | 4/1927 | Desautels | 156/463 X |
| 1,763,297 | 6/1930 | Fowler | 156/463 X |
| 2,046,341 | 7/1936 | McDarlin | 81/9.51 X |
| 3,125,263 | 3/1964 | Harbour | 156/577 X |
| 3,952,552 | 4/1976 | Rozner | 118/405 X |
| 4,105,490 | 8/1978 | Lass | 156/577 X |
| 4,115,180 | 9/1978 | Scalia | 156/201 X |

FOREIGN PATENT DOCUMENTS

| | | | |
|---|---|---|---|
| 1326256 | 8/1973 | United Kingdom | 156/584 X |

*Primary Examiner*—David A. Simmons
*Attorney, Agent, or Firm*—Pollock, Vande Sande & Priddy

[57] ABSTRACT

An improved tape dispenser and applicator assembly for wrapping a foil-like tape about edge portions of glass pieces and similar material, wherein the assembly includes at least one roller assembly formed by a pair of rollers biased against one another. A groove straddles the pair of rollers, with the groove automatically providing a substantially uniform pressure for pressing the tape into contact with the glass edge portion.

16 Claims, 8 Drawing Figures

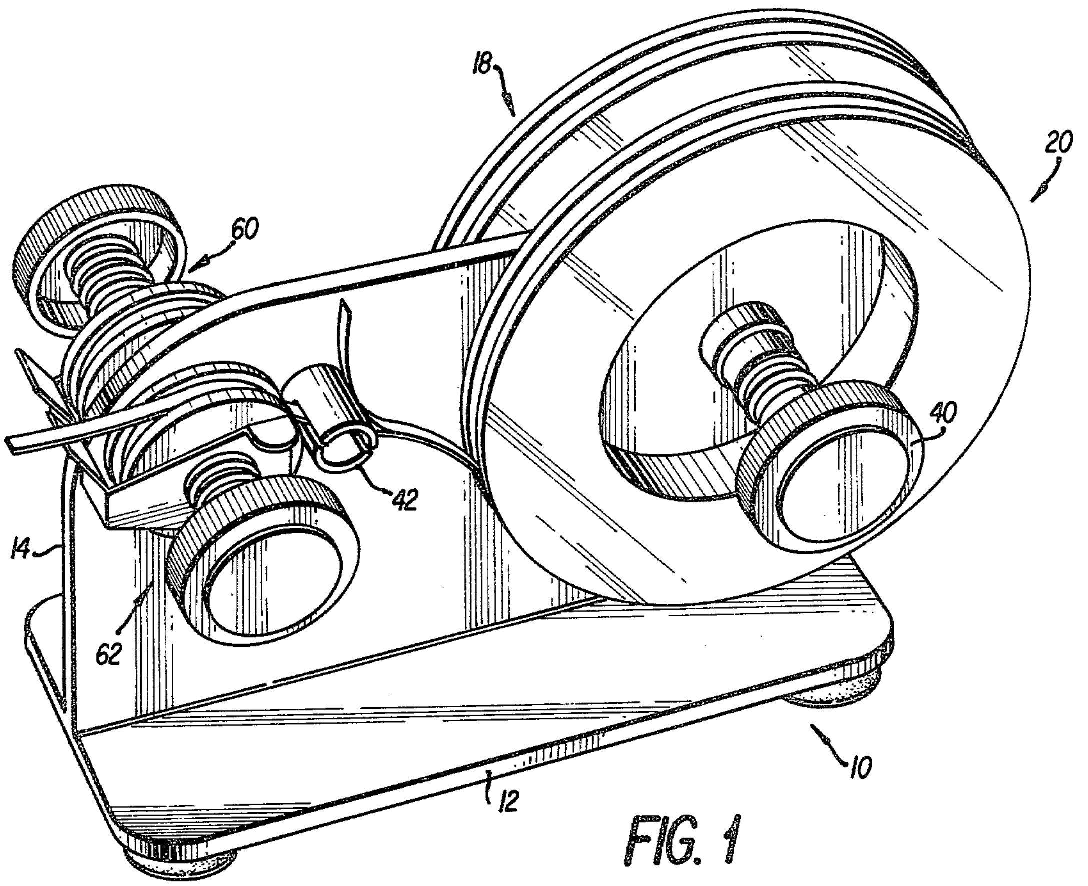
FIG. 1
FIG. 2
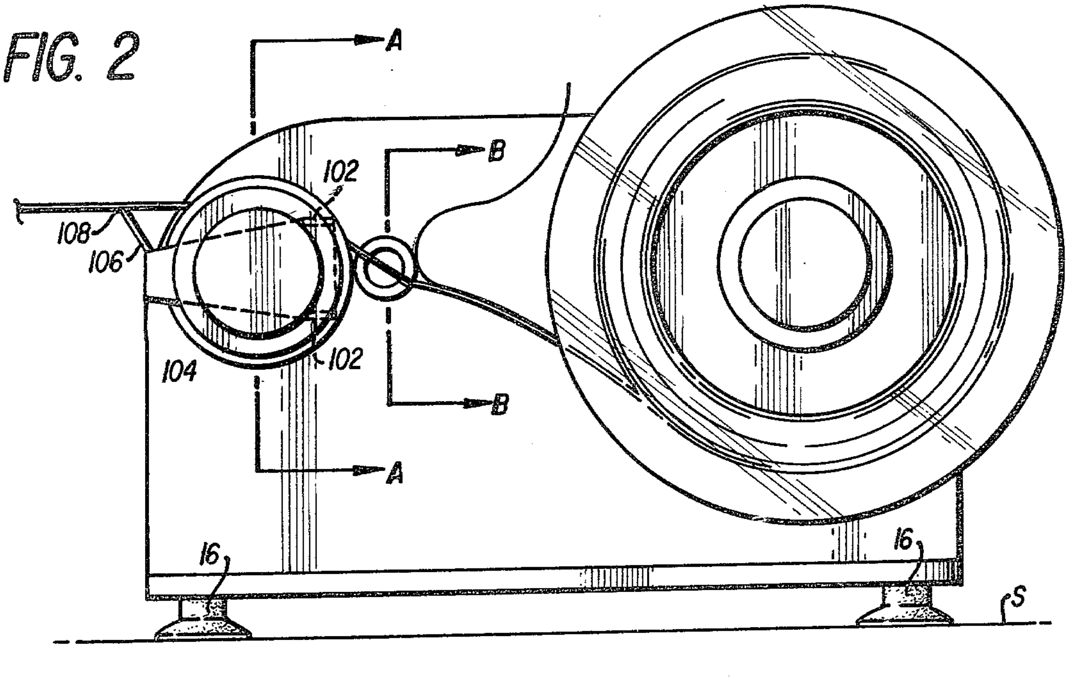

FIG. 3
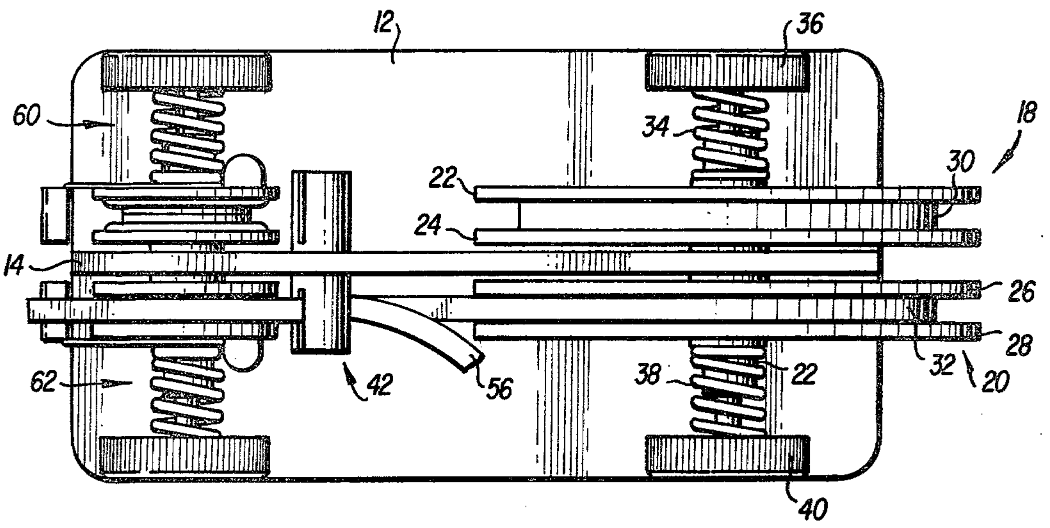
FIG. 4A
(PRIOR ART)
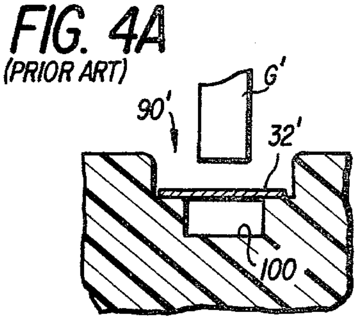
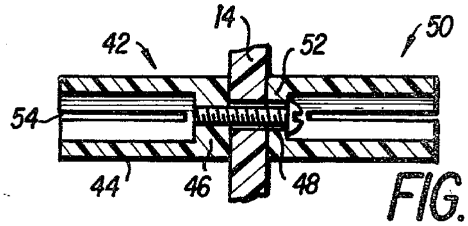
FIG. 6
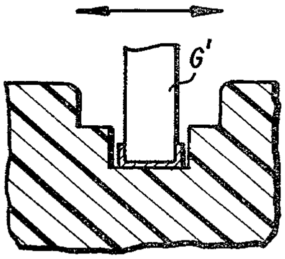
FIG. 4B
(PRIOR ART)
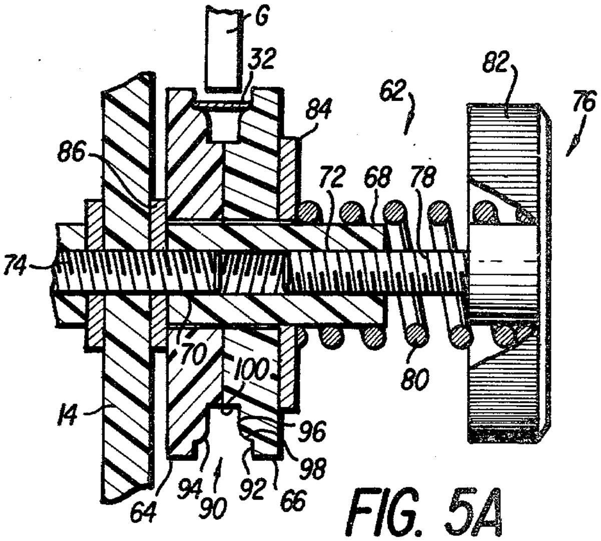
FIG. 5A
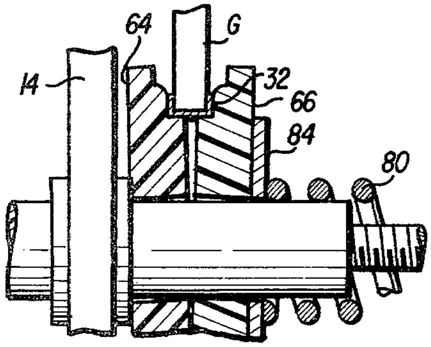
FIG. 5B

TAPE DISPENSER AND APPLICATOR ASSEMBLY

DESCRIPTION

1. Technical Field

The invention relates to a tape dispenser and applicator assembly, and, more particularly, to an assembly for wrapping foil-like tape about edge portions of glass and similar materials.

2. Background Art

It is well-known that copper foil can be wrapped about edge portions of glass material and the like to provide a base for soldering the chips to one another during formation of stained glass art such as windows and lampshades. Normally, one side of the foil-like tape is provided with an adhesive material capable of adhering to an edge portion of the galss material. The earliest method of attaching the foil to the glass material consisted of merely hand pressing the glass and the foil against one another. The major drawback of this procedure is the risk of glass splinters cutting the hand, even when heavy duty work gloves are worn. Usually, the glass splinters result from broken edge portions of the glass material, which may take the form of glass chips.

In an effort to reduce the risk of injury, as well as to more uniformly apply the foil-like tape to the glass edge, applicator devices have been developed for applying the foil to the glass chips. One of the main problems confronting such applicator devices is the fact that stained glass chips may vary considerably in both size and thickness. This poses a problem in that most applicators usually employ a standard size groove for pressing the foil and glass into engagement. As a result, many glass chips may have edge portions which are too thick for insertion into the standard groove. A further problem facing such applicators is the need to separate a protective backing strip from the side of the foil-like tape including the adhesive material.

Finally, when the applicator has been used to wrap a glass chip edge portion with foil, a further problem arises as to how to quickly and easily cut the tape from the roll.

One attempt at overcoming these problems is suggested in U.S. Pat. No. 4,115,180 issued Sept. 19, 1978 to Scalia, wherein a groove assembly of uniform width is formed in a single roller. If the groove is wider than the edge portion of the chip, the glass chip is alternatively pressed against the opposing sides of the groove to wrap the tape about the edge portion of the glass chip. On the other hand, if the groove is narrower than a particular piece of glass, the groove will separate to allow insertion of the glass edge portion. Strip bars are positioned between the applicator roller and a drum supporting the roll of tape, with the strip bars functioning to separate the tape from a backing strip.

The Scalia assembly has proven to be less than completely satisfactory for several reasons. When the groove is oversized as compared to the glass, the glass must be alternatively pressed against the side walls of the groove with exactly the same pressure to ensure uniform attachment of the tape. As a result, uneven pressure may cause one side to prematurely separate. Also, while moving the glass chip toward the side wall of the groove, the glass chip can function to bunch the tape into the corner of the groove, thereby preventing smooth contact between the tape and the edge portion of the glass. In addition, the required side motion of the glass chip within the groove increases the chances of injury from splinters dislodged from the glass chip.

A further problem arises when the groove is narrower than the width of the glass chip. Because the side walls of the groove in Scalia extend substantially parallel to one another, the side walls must bow outwardly from one another as an oversized edge portion is inserted therebetween. The outwardly bowed side walls can not provide a uniform contact pressure for wrapping the foil against the edge portion. In practice, the contact pressure will decrease as the distance from the bottom of the groove increases.

Accordingly, it is an object of the present invention to provide a dispenser and applicator assembly including a groove assembly capable of automatically compensating for glass pieces of varying thicknesses while maintaining a substantially uniform pressure between opposide side wall portions of the groove assembly and an edge portion of the glass piece.

A further object of the present invention is to provide a dispenser and applicator assembly, wherein a sleeve shaped stripper assembly includes a pair of aligned slots to allow the tape to pass threrethrough, with said stripper assembly being formed of a non-stick, fluorinated hydrocarbon polymer material such as polytetrafluoroethylene or fluorinated ethylene-propylene co-polymers, which may be sold under the trade name "Teflon".

Another object of the invention is to provide a dispenser and applicator assembly, wherein a pair of applicator rollers each form a portion of a groove assembly, with the rollers being spring biased against one another.

A yet further object of the present invention is to provide a dispenser and applicator assembly, wherein a cutter assembly is pivotally mounted in a support shaft extending through the pair of applicator rollers.

These and other objects of this invention will become apparent from a review of the detailed specification which follows and a consideration of the accompanying drawings.

DISCLOSURE OF THE INVENTION

In order to achieve the objects of the invention and to overcome the problems of the prior art, the dispenser and applicator assembly, according to the invention, includes a frame assembly having a base portion and an attached upright portion. At least one drum assembly is mounted on the frame, with a roll of foil-like tape rotatably supported on the drum assemoiy. The tape has an adhesive material attached to a radially outwardly facing side portion.

An applicator assembly is also attached to the frame, with the applicator assembly supporting a portion of the tape during application to a bottom edge portion of glass or similar material, while simultaneously, resiliently pressing toward opposite sides of the edge portion with a substantially uniform pressure, causing a uniform, smooth adherence of the tape to opposite sides of the edge portion.

The invention further provides a stripper assembly intersecting a portion of the tape located between the drum and applicator assemblies. The stripper assembly is formed with a curved and slotted wall portion substantially facing the drum assembly, with the curved wall portion being formed of a non-stick, fluorinated hydrocarbon polymer, such as polytetrafluoroethylene or fluorinated ethylene-propylene co-polymers, which may be sold under the trade name of "Teflon".

BRIEF DESCRIPTION OF DRAWINGS

The present invention can be best understood with reference to the accompanying drawings, wherein:

FIG. 1 shows a perspective view of a preferred embodiment of the present invention;

FIG. 2 shows a side view of the embodiment of FIG. 1;

FIG. 3 shows a top view of the embodiment of FIG. 1;

FIGS. 4A and 4B show a partial cross-sectional view of a prior art applicator assembly, both before and after insertion of a glass chip;

FIGS. 5A and 5B show a partial cross-sectional view of the preferred embodiment taken along the section A—A in FIG. 2, both before and after insertion of a glass chip; and FIG. 6 shows a cross-sectional view of a stripper assembly employed in the preferred embodiment and taken along the section B—B in FIG. 2.

BEST MODE FOR CARRYING OUT THE INVENTION

The remaining portion of this specification will describe preferred embodiments of the invention when read in conjunction with the attached drawings, in which like reference characters identify identical apparatus.

Referring to the drawings, and to FIGS. 1–3 in particular, a frame assembly 10 includes a base portion 12 and an attached upright portion 14 which forms an angle of substantially 90° with the base portion. A plurality of spaced suction members 16 are mounted on base portion 12 for attachment with a support surface generally indicated at S in FIG. 2.

A pair of substantially identical drum assemblies 18 and 20 are mounted on opposite sides of upright portion 14, with each drum assembly rotatably supported on a common shaft 22 extending through and fixedly attached to upright portion 14. Each drum assembly 18 and 20 includes a pair of spaced, confronting plate members 22, 24 and 26, 28, respectively.

A first spring 34 is biased between a handle 36 and a flange portion of plate 22, while a second spring member 38 is biased between a handle 40 and a flange portion of plate member 28. Each handle 36 and 40 is also threaded into engagement with common shaft 22, whereby rotation of either handle adjusts the spring pressure biasing the pairs of plates 22, 24 or 26, 28 toward each other. A separate roll of foil-like material is selectively mounted between each pair of confronting plate members, with the rolls of foil being indicated at 30 and 32, respectively.

Because the separate dispensing and applicator apparatus mounted on either side of upright portion 14 are identical, an explanation of the dispensing and applicator apparatus mounted on one side of upright portion 14 is considered sufficient for a proper understanding of the remaining apparatus.

A stripper assembly generally indicated at 42 in FIG. 3 is attached to upright portion 14. As best shown in FIG. 6, stripper assembly 42 includes a sleeve-shaped member 44 of substantially cylindrical configuration which is enclosed at one end 46. A longitudinally extending, threaded aperture extends through end portion 46, with the aperture being aligned with a further aperture formed through upright portion 14. A threaded screw 48 extends through the aperture in upright portion 14 and threadedly engages the aperture formed in end portion 46. As shown in FIG. 6, a further stripper assembly 50 can also be mounted on threaded screw 48 by merely forming a yet further aperture through a closed end portion 52 of stripper assembly 50, with threaded screw 48 extending through all three aligned apertures. A pair of aligned, identically-shaped slots 54 are formed on opposite sides of sleeve 42, with only one of the slots visible in FIG. 6. Each slot 54 extends in a direction substantially parallel to a longitudinal axis of stripper assembly 42 with one of the slots 54 substantially facing drum assembly 20. In a similar manner, stripper 50 also includes a pair of aligned slots with one of the slots substantially facing drum assembly 18.

In a preferred embodiment of the present invention, each stripper assembly 42 and 50 is formed of a non-stick, plastic material of the fluorinated hydrocarbon polymer type, as for example polytetrofluoroethylene or fluorinated ethylene-propylene co-polymers, which may be sold under the trade name "Teflon". Furthermore, in a preferred embodiment, the width of aligned slots 54 is substantially 0.02 inches, while the length is substantially 9/16 inch. It should be pointed out that because the stripper is made of "Teflon" or similar non-stick plastic material, the slot will tend to collapse slightly when foil does not extend through the slot and expand slightly as the foil is inserted through the slot. Also, it is considered within the scope of the present invention to form either or both stripper assemblies with slots of dimensions differing from the above-described preferred sizes, dependent on the actual size of the foil to be employed in wrapping edge portions of the glass chips or the like. Likewise, materials other than "Teflon" may be employed, provided such materials exhibit a substantially "non-stick" surface. This is necessary to ensure that the exposed adhesive on the tape will not adhere to wall surfaces of the stripper assembly.

During operation, a strand of foil 32, including a backing strip 56 attached on one side, is led from drum assembly 20 toward stripper assembly 42. The backing strip is separated from a portion of the foil and the portion is fed through the pair of aligned slots 54. As additional foil is unwound from drum assembly 20, stripper 42 automatically separates backing strip 56 from foil 32 as foil 32 passes through the aligned slots 54 without the exposed adhesive adhering to the walls of either slot 54.

In an alternative embodiment, the cylindrically-shaped sleeve 42 is eliminated and replaced with a curved member having a single slot extending longitudinally therethrough, with the curved member having a "Teflon" surface facing drum assembly 20.

Referring again to the preferred embodiment as shown in FIG. 3, a pair of applicator roller assemblies are generally indicated at 60 and 62, respectively. Because the roller assemblies are essentially identical in structure, an explanation of roller assembly 62 is considered sufficient for a proper understanding of the remaining roller assembly 60.

As best shown in FIG. 5A, applicator roller assembly 62 includes a pair of separate roller members 64 and 66, respectively. The rollers are positioned in side-by-side relationship and each roller 64, 66 is rotatably supported on a common support shaft 68 extending through aligned apertures formed through rollers 64 and 66. Support shaft 68 includes a first threaded bore 70 extending longitudinally through an end portion thereof, and a second threaded bore 72 extending longitudinally through an opposite end portion thereof. A threaded steel pin 74 extends through an aperture formed in upright portion 14 and threadedly engages aperture 70. The steel pin 74 provides sufficient support to prevent shaft 68 from separating from upright portion 14 during use. A handle assembly 76 includes a threaded end portion 78 which threadedly engages bore 72. A spring 80 surrounds a portion of shaft 68 and threaded end portion 78 of handle assembly 76, with one end of spring 80 contacting a hollow handle portion 82 of handle assembly 76 which is attached to threaded portion 78. An opposite end portion of spring 80 contacts a cutter assembly 84 pivotally mounted on shaft 68 and abutting roller 66. A washer 86 surrounds threaded steel pin 74 and is positioned in abutting relationship with upright portion 14 on one side and both roller 64 and shaft 68 on the opposite side. Finally, it is noted that the outer surface portions of each of the rollers 64, 66 is provided with a satin or frosted finish to allow easy identification of a tape mounted on the rollers, as will become apparent hereafter.

During operation, handle assembly 76 is selectively rotated to vary the distance between cutter assembly 84 and handle portion 82, thereby varying the effective size of spring 80. As spring 80 changes in size, the biasing pressure exerted by spring 80 against roller 64 is altered. Spring 80 serves to bias and maintain rollers 64 and 66 in abutting contact with one another.

The remaining applicator roller assembly 60 is supported on an opposite end portion of threaded steel pin 74 in a manner identical to the above-described assembly for attaching applicator roller assembly 62 to pin 74. It should be pointed out that the present invention is not to be limited to a construction employing exactly two applicator roller assemblies, two stripper mechanisms and two drum assemblies as shown. Rather, it is considered within the scope of the present invention to employ one, two or a plurality of separate assemblies, with each assembly being mounted on upright portion 14 of frame 10.

As shown in FIGS. 5A and 5B, a groove assembly 90 is formed in confronting, outer surface portions of abutting rollers 64 and 66, respectively. Groove assembly 90 includes a first section 92 formed by substantially parallel side wall portions each extending in a substantially radial direction from an outer surface of rollers 64 and 66, respectively. A second section 94 is also formed by a pair of spaced side wall portions each extending substantially parallel to one another with section 94 having a width less than section 92.

Each side wall portion of groove assembly 90 includes a smoothly curved portion 98 of substantially constant radius which joins section 92 with section 94. During insertion of a glass piece edge portion G into groove assembly 90, smoothly curved wall portions 98 serve to smoothly guide edge portion G into section 94. Finally, groove assembly 90 includes a third section 96 which has one end portion engaging section 94 and a further end portion engaging a bottom surface 100 of groove assembly 90. Radius 98 and section 94 may have a combined depth which is substantially equal to the depth of section 96. However, the width of section 96 increases at a substantially constant rate between an end portion engaging section 94 and an opposite end portion engaging bottom 100. In other words, the side wall portions of section 96 taper away from one another from section 94 toward bottom 100.

In a preferred embodiment, section 90 has a width which is substantially 0.008 inches greater than the standard width of the particular foil tape 32. Section 94 has a substantially constant width of 0.008 inches less than the width of the tape and section 96 has a width which increases from 0.008 inches less than the tape where joining section 94 to 0.006 inches less than the width of the particular tape employed at bottom 100. It should be pointed out that foil tapes usually come in a variety of widths between 3/16 inch up to and beyond ½ inch. As tapes of varying widths are employed, different pairs of rollers 64 and 66 are quickly mounted on shaft 68, with the particular pair of rollers used being dependent on the particular tape employed. In other words, each pair of rollers 64 and 66 would have a groove assembly 90 of a size suitable for use with a particular width of tape. Furthermore, in a preferred embodiment, section 92 has a depth of ⅛ inch, while sections 94, 96 and radius 98 will have a combined depth of ⅛ inch.

The operation of applicator roller assembly 62 can be best understood by comparing assembly 62 with the roller assembly employed in the prior art Scalia patent which is shown in FIGS. 4A and 4B, respectively. In particular, Scalia suggests that groove assembly 90′ can be wider than the width of a glass chip edge portion G′. Therefore, as an edge portion 6′ is inserted into groove assembly 90′, it will press a portion of a tape 32′ against a bottom surface 100′ of groove 90′. As is clearly evident from FIG. 4B, neither side wall portion of glass chip G′ contacts a side of groove 90′. In order to wrap tape 32′ against glass chip G′, the glass chip must be first pressed against one side of groove 90′ and then pressed against the opposite side, as indicated by the arrow B in FIG. 4B.

Scalia also suggests that an edge portion G′ having a width greater than the substantially constant width of groove assembly 90′ can be inserted into groove assembly 90′ by merely wedging edge portion G′ into the groove. Such an action must result in the side wall portions of groove assembly 90′ bowing away from one another. The further that edge portion G′ is inserted, the greater the distance the side walls must bow. As a result of their bowed shape, the side walls can not provide a uniform pressure against the edge portion G′. In fact, the pressure will tend to decrease as the distance from bottom 100′ increases. This means that tape 32′ can not be uniformly pressed against edge portion G′, and a serious risk of premature separation of tape 32′ from edge portion G′ will exist.

In comparison, the uniquely tapered section 96 of groove assembly 90 ensures a substantially constant pressure over the side wall portions of groove 90 forming sections 94 and 96. In effect, the width of section 94 has been reduced in order that the expansion of section 94 will result in sections 94 and 96 having substantially the same width, thereby significantly reducing the adverse bowing effect confronting prior art such as the Scalia device.

The cutter assembly 84 is best shown in FIGS. 1 and 2 and includes a pair of tabs 102 connected to a body member 104. Body member 104 has an aperture extending therethrough for insertion of shaft 68 through cutter assembly 84. A flange member 106 is also attached to body member 104 with flange member 106 extending substantially perpendicular to body member 104. Flange member 106 includes a knife edge 108, with knife edge 108 extending substantially parallel with shaft 68. By pulling foil 32 downwardly across knife edge 108, the foil can be easily cut upon completion of the wrapping process in a counterclockwise direction about shaft 68 to remove knife edge 108 from the work area of groove assembly 90.

In a preferred embodiment of the invention, frame 10, drum assemblies 18 and 20 and applicator roll assemblies may each be formed of a rigid polyurethane material such as plexiglass. Alternatively, any and all of these components may be formed from other types of plastic or even metallic materials. It is noted that the stripper mechanism can be selectively rotated to orient the slots 54 as desired relative to drum 18. In a preferred embodiment, the slots 54 are substantially horizontally aligned with one another, allowing stripper 42 to remove the tightly attached backing strip from almost any type of tape including even Scotch brand electrical tape No. 1194.

The present invention is not to be limited to the above-described embodiments, but is to be limited only by the scope of the following claims.

We claim:

1. An assembly capable of supplying a uniform pressure for wrapping a foil-like tape about an edge portion of glass or similar material, while automatically compensating for edge portions of varying thicknesses, and comprising:

a frame assembly, including a base portion and an attached upright portion;

drum means mounted on said upright portion for rotatably supporting at least one roll of foil-like tape of the type having a layer of adhesive on a radially outward side portion when in the rolled state;

applicator means including separate portions each tiltably mounted on a support shaft assembly extending outwardly from said frame for supporting a portion of said tape during application to said edge portion, while simultaneously pressing toward opposite sides of said edge portion with a substantially uniform pressure, causing uniform and smooth adherence of said tape to opposite sides of said edge portion;

groove means formed in adjacently disposed end surfaces of said separate portions of said applicator means for providing a uniform pressure to press a portion of said tape against opposite side wall surfaces of said edge portion of glass or the like during movement of said glass through said groove means;

said groove means comprising a groove assembly of variable width including a first section having a width at least as wide as the width of said tape, a second section having a width less than a minimum width of said edge portion of glass and a third section extending between said second section and a bottom surface of said groove assembly, wherein said third section increases in width as the distance from a bottom surface of said groove assembly decreases.

2. An assembly according to claim 1, wherein said applicator means comprises a pair of separate roller members mounted in side-by-side abutting relationship on a common support shaft assembly extending from said upright portion.

3. An assembly according to claim 2, wherein said support shaft assembly includes separate portions extending outwardly from opposite sides of said upright portion of said frame, with a separate pair of separate roller members mounted in side-by-side abutting relationship on each portion of said support shaft assembly.

4. An assembly according to claim 2, wherein a handle threadedly engages said support shaft and a spring member is compressed between said handle and one of said pair of abutting rollers for biasing said pair of rollers into abutment with one another.

5. An invention according to claim 1, wherein said drum means comprises a support shaft assembly extending outwardly from said upright portion, said drum means further comprises a pair of plate-like members mounted on a further support shaft, with said roll of foil-like tape positioned between said plate-like members.

6. An invention according to claim 5, wherein said drum means further comprises a handle attached to said support shaft and a spring biased between said handle and one of said plate-like members.

7. An invention according to claim 5, wherein said support shaft includes separate portions extending outwardly from opposite sides of said upright portion of said frame, with a pair of plate-like members mounted on each portion of said further support shaft.

8. An invention according to either claim 3 or 6, wherein a steel pin extends through said upright portion of said frame and threadedly engages each of said separate portions.

9. An assembly according to claim 1, wherein a stripper assembly extends outwardly from said upright portion and intersects a portion of said tape extending between said drum means and said applicator means, said stripper assembly including a curved wall portion substantially facing said drum means, and non-stick slot means having a collapsible opening extending through said curved wall portion for allowing said adhesive tape to pass through said stripper assembly without sticking thereto while simultaneously separating a backing strip from said tape and preventing said backing strip from being drawn through said curved wall portion of said stripper assembly.

10. An assembly according to claim 9, wherein said stripper assembly includes a cylindrically-shaped body member having a pair of elongated slot means each extending along opposite wall portions in a direction parallel to a longitudinal axis through said body member, with said pair of slot means being aligned with one another.

11. An assembly according to claim 9, wherein said non-stick slot means comprises an elongated slot formed of a fluorinated hydrocarbon polymer substance.

12. An invention according to claim 1, wherein a cutter assembly is pivotally mounted on said support shaft assembly and positioned adjacent to one of said roller members.

13. An invention according to claim 12, wherein said cutter assembly includes a body member and an attached flange extending substantially perpendicular to said body member, said flange including a knife edge for engaging and cutting said tape.

14. An assembly capable of supplying a uniform pressure for wrapping a foil-like tape about an edge portion of glass or similar material, while automatically compensating for the glass having edge portions of varying thicknesses, and comprising:

a frame assembly including an upright portion;

drum means mounted on said upright portion for rotatably supporting at least one roll of foil-like tape of the type having a layer of adhesive on a radially outward side portion when in the rolled state;

an applicator assembly including a pair of separate roller members each having a bore extending transversely therethrough, with each bore having a diameter greater than a diameter of a portion of a support shaft assembly extending outwardly from said frame, allowing each roller member to be tiltably mounted on said portion of said support shaft, and biasing means mounted on said support shaft assembly and contacting one of said roller members for biasing said one roller member toward a remaining roller member;

groove means formed on confronting end surface portions of said pair of separate roller members for providing a uniform pressure to press a portion of said tape against opposite side wall surfaces of said edge portion of glass during movement of said glass through said groove means;

said groove means comprising a groove assembly of variable width including a first section having a width at least as wide as the width of said tape, a second section having a width less than a minimum width of said edge portion of glass and a third section extending between said second section and a bottom surface of said groové assembly, wherein said third section increases in width as the distance from a bottom surface of said groove assembly decreases;

whereupon insertion of said edge portion of glass or the like into said groove means forces said separate roller members to tilt relative to one another on said support shaft assembly until a substantially entire surface portion of third section of said groove assembly makes surface contact with said edge portion.

15. An assembly according to claim 14, wherein said groove assembly includes a first pair of confronting wall surfaces extending substantially parallel to one another and defining said first section, said groove assembly further includes a second pair of confronting wall surfaces extending substantially parallel to one another and defining said second section, with a pair of smoothly curved connecting wall surfaces joining said first and second sections to one another, said groove assembly further includes a third pair of confronting wall surfaces defining said third section and continuously tapering away from one another as the distance from the bottom surface of said groove assembly decreases.

16. An assembly according to claim 14, wherein said bottom surface of said groove assembly has a width which is no greater than a minimum width of said edge portion of glass or similar material.

* * * * *